Dec. 7, 1965

E. L. GARWIN ET AL 3,222,449

MAGNETIC SHIELD ARRANGEMENTS

Filed July 23, 1962

EDWARD L. GARWIN
LEE O. HEFLINGER
INVENTORS

BY Fraser and Bogucki

ATTORNEYS

United States Patent Office

3,222,449
Patented Dec. 7, 1965

3,222,449
MAGNETIC SHIELD ARRANGEMENTS
Edward L. Garwin, Redondo Beach, and Lee O. Heflinger,
Torrance, Calif., assignors, by mesne assignments, to
GTC Corporation, a corporation of Texas
Filed July 23, 1962, Ser. No. 211,507
3 Claims. (Cl. 174—35)

This invention relates generally to magnetic shields, and more particularly relates to a magnetic enclosure for shielding an electronic component from the undesirable effects of extraneous magnetic fields.

The magnetic shield of the present invention is particularly directed to the problem of enclosing and shielding a gas cell which is employed in a rubidium frequency standard. In such an aplication, the monochromatic light source is arranged to supply optical "pumping" radiation which is directed through a gas cell associated with a microwave cavity to opitcal detection apparatus. The resonant frequency of the gas cell and microwave cavity is affected by the magnetic field present in the vicinity of the cavity. Without appropriate shielding this field may vary considerably under different environments and geographical locations. It is desirable, in order to maintain the resonant frequency as stable as possible, to establish a constant magnetic field which is not affected by stray field components, such as the earth's magnetic field. It therefore becomes extremely important to shield the gas cell and microwave cavity from the earth's magnetic field and from any other magnetic fields which might cause interference in order to achieve the desired precise control of the resonant frequency of operation.

The rubidium frequency standard in which the shielding arrangements of the present invention are designed to be used is limited in size and weight. Such limitations are imposed because of particular applications in which the frequency standard is needed to provide extremely precise frequency and timing measurements. Accordingly, many of the concepts which have been applied in developing magnetic shields for use in other aplications are simply not feasible for use in conjunction with the frequency standard here involved.

While it is the frequency standard gas cell in particular that requires magnetic shielding, the fact that the gas cell is part of an optical radiation path imposes the need to enclose the light source and the detector along with the gas cell within the magnetic shield. Ordinarily, it might be possible to enclose the electronic elements to be shielded in a closed box which is welded together so as to exclude any air gaps. This construction, however, does not permit heat treating of the shielding arrangement because of possible damage to the enclosed elements, nor does it permit the disassembly of the magnetic shield which is occasionally necessary to permit access to the enclosed elements. Thus such an arrangement is not feasible for the purpose described.

Various types of magnetic shields have been devised in the past for this and similar purposes. One type of shielding arrangement utilizes a plurality of spheres in nested relationship. Each of the spheres is divided along an equator to permit the assembly or disassembly of the shield. However, it will readily be seen that the size of the spheres must be rather large to enclose an elongated structure, and as a result such a magnetic shield is undesirably heavy and cumbersome. Accordingly, it is unsuitable in any environment where space and weight are at a premium.

Other magnetic shielding arrangements comprise one or more open-ended pipes or cylinders. Such a configuration shields against magnetic fields which are at right angles to the axis of the cylinders, but when the extraneous magnetic field includes a component parallel to the axis of the cylinder, the shielding is inadequate. It is this particular component of stray field which is the most troublesome to the rubidium frequency standard gas cell since the gas cell is inherently more sensitive to longitudinal field components. To overcome this drawback with open-ended cylinders it has then been proposed to terminate the cylinder with suitable caps to close up the two open ends. However, unless the overlap between the end caps and the main cylinder is substantial, this arrangement is not very effective. Thus, the reluctance of the air gaps between the cylinder and its caps may be large enough to permit the magnetic flux to enter the region which is to be shielded. It would, of course, be helpful to reduce the size of this air gap, but this presents mechanical problems of fabrication. The shields are usually made of Mu-metal, which has good magnetic properties, and such material must be heat treated or annealed after fabrication. After this heat treatment the configuration of the caps becomes distorted and hence the size of the air gap between the cylinder and its caps cannot be reduced beyond a certain minimum value.

On the other hand, as pointed out before, it may be possible to minimize this effect by using relatively large end caps which provide a large overlap with the cylinder. This in turn requires deep drawing of a cap of Mu-metal. To this end special dies are needed which render the process both time consuming and expensive.

It is accordingly an object of the present invention to provide a magnetic shield for shielding an electronic device from the earth's magnetic field or from other undesired magnetic fields and one which is particularly effective in shielding the device from magnetic field components extending parallel to the axis of the device.

It is a specific object of the invention to provide such an effective magnetic shield which may be readily disassembled.

Another object of the present invention is to provide a magnetic shield for the purposes outlined herein which is easy to manufacture and which does not require costly dies for its fabrication.

A further object of the invention is to provide a magnetic shield which is rugged, lightweight and requires a minimum of space.

In accordance with the present invention there is provided a magnetic shield for shielding an enclosed device which may, for example, be a gas cell of the rubidium type. The shield will protect the device from the earth's magnetic field and from other interfering magnetic fiields. The shield comprises at least two elements, each of which includes at least one member of magnetic material having a rectangular outline when flat. The member is shaped to provide a closed loop, thus providing a low reluctance path for magnetic flux. The two elements are assembled in nested relationship, one inside the other, in such a manner that the open sides or faces formed by the inner element are substantially covered by the loop of the outer element.

Preferably, each of the elements is made of single continuous band or sheet closed upon itself and the loop thus formed is substantially rectangular in cross section. If desired, additional elements may be provided in added layers as needed.

A better understanding of the invention may be had from a consideration of the following description, when read in connection with the accompanying drawings, in which.

Figure 1:
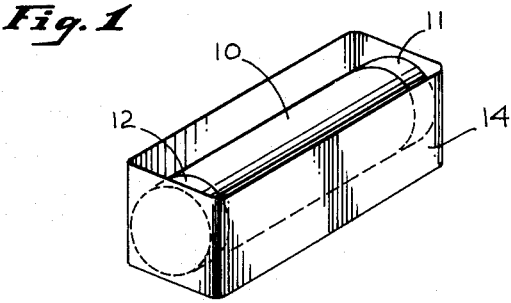
FIG. 1 is a view in perspective of a partially disassembled magnetic shield in accordance with the present invention and showing the preferred embodiment thereof.
Figure 2:
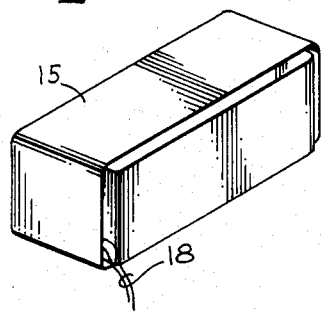
FIG. 2 is a view in perspective of the shield of FIG. 1 illustrating two nested shielding bands disposed thereabout.
Figure 3:
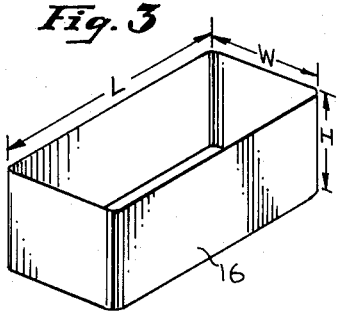
Figure 4:
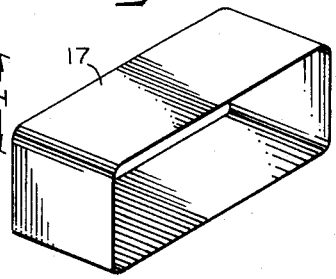
Figure 5:
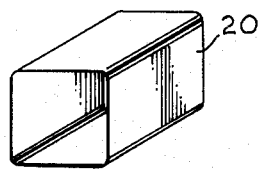
Figure 6:
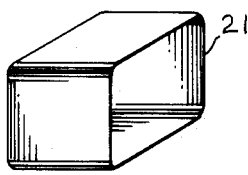
Figure 7:
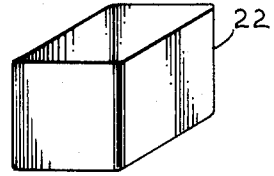
Figure 8:
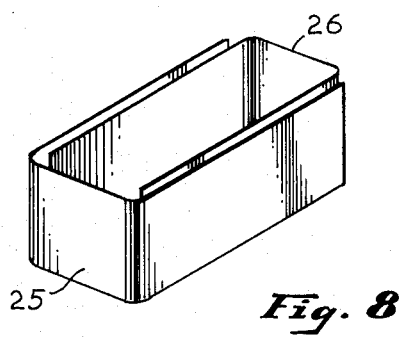

FIGS. 3 and 4 are views in perspective showing two further bands which may be disposed about the assembly of FIG. 2;

FIGS. 5, 6 and 7 are perspective views of three bands which may be disposed in nested relationship about each other to provide another magnetic shield arrangement in accordance with the present invention; and FIG. 8 is a view in perspective showing an alternative arrangement of one of the bands forming the shield of the invention.

Referring now to the drawings, and particularly to FIGS. 1–4, there is illustrated one particular arrangement of a magnetic shield in accordance with the invention. The shield illustrated in these figures is particularly designed to shield a gas cell, such as may be employed in a rubidium frequency standard, from the deleterious action of extraneous magnetic fields having components extending parallel to the axis of the device. The gas cell has not been illustrated in the drawings. However, it is to be understood that the magnetic shield of the invention may be utilized to shield any other device which requires shielding from magnetic fields. It is further to be understood that the shield of the invention is also effective to shield a particular device from a magnetic field extending in a direction other than along the axis of the device, although it is particularly effective in shielding out axial field components.

While in the arrangement shown in FIGS. 1–4 the magnetic shield includes an open-ended cylinder 10 having a size such as to enclose the entire device to be shielded, it is to be understood that the principal shielding effect achieved by the use of this arrangement results from the remaining portion of the arrangement provided in accordance with the invention. The cylinder 10 is provided with two end caps 11 and 12 which preferably have a tight fit with the cylinder 10. However, a large overlap between the cylinder 10 and its caps 11, 12 is not required.

A first shielding band 14 surrounds the cylinder 10. The band 14 consists of a sheet of magnetic material such as Mu-metal which is rectangular in outline when flat. This band 14 is then welded together at its ends to provide a continuous loop. The welding may be done by arc welding using a shield of inert gas, assuming that the band 14 consists of Mu-metal. Thereafter the band may be heat treated or annealed. A second band 15 illustrated particularly in FIG. 2 is then disposed about the first band 14 in such a manner that the band 15 covers the open sides or faces of the band 14.

FIGS. 3 and 4 illustrate two additional bands 16 and 17 which may be used to further enclose the assembly of FIG. 2. Again the band 16 will be disposed about the band 15 in nested relationship in such a manner that it covers the open faces of the band 15. Similarly, the fourth band 17 is disposed about the remainder of the assembly so as to cover the open faces of the band 16.

In the preferred arrangement of a magnetic shield in accordance with the invention for use in a rubidium frequency standard as described above, maximum shielding is desired and therefore a material such as Mu-metal is employed. However, it will be appreciated that the effectiveness of magnetic shielding achieved by the described arrangement in accordance with the invention is such that less expensive magnetic materials, such as transformer iron, may be used with a resulting reduction in cost and complexity of the fabrication process in many applications where the maximum possible shielding effect is not essential. Accordingly, the present invention permits effective shielding for many uses without dependence upon Mu-metal or equivalent materials. Furthermore, it should be pointed out that the cylinder 10 and its end caps 11 and 12 may be omitted if desired, since the principal shielding effect is provided by the nesting arrangement of shielding bands included in the described embodiment.

Where the device protected by the shield of FIGS. 1–4 requires electric power or external control, as in the case of rubidium gas cells, a cable such as is illustrated at 18 may be provided and may be extended through suitable slots or notches in the respective bands to supply the electrical connection. Similarly, electrical signals may be applied to or obtained from the device through suitable conductors. It will be apparent that such a cable is preferably folded back and forth between the various shields.

The spacing between successive bands of the magnetic shield of the invention may be optimized if desired, taking into account the degree of shielding needed and the space available for the purpose. In this connection reference is made to an article by W. G. Wadey entitled, "Magnetic Shielding with Multiple Cylindrical Shells," Rev. of Sci. Inst., Nov. 1956, vol. 27, pp. 910–916, discussing optimization of spacing for long cylindrical shells. Reference is also made to a paper by R. D. Teasdale which appears in the "Proceedings of the National Electronics Conference," vol. 9, February 1954, pages 580–590. This paper gives experimental measurements of the shielding effectiveness of short cylinders. It also includes measurements where the field is parallel to the cylinder axis.

For a specific application of the magnetic shield of FIGS. 1–4 particular dimensions which produce optimum results for a certain limited space having room at the ends but restricted lateral dimensions are as follows. In this arrangement the cylinder 10 and the various bands 14–17 consist of Mu-metal having a thickness of 0.050 inch. The diameter of the cylinder 10 is 4 inches and its length 8.3125 inches. All dimensions may be summarized in the following table (all figures are outer dimension given in inches for the dimensions designated in FIG. 3 with each band positioned as shown therein):

|  |  | H | W | L |
|---|---|---|---|---|
| Band 1 | inches | 4.10 | 4.20 | 8.984 |
| Band 2 | do | 4.30 | 4.20 | 9.656 |
| Band 3 | do | 4.30 | 4.40 | 10.328 |
| Band 4 | do | 4.40 | 4.40 | 11.00 |

It will be readily apparent from the table that the lateral dimensions (height and width) of each band may be chosen in such a manner that the bands just fit into each other and overlap each other to a small extent, thus achieving the desired shielding for the enclosed device within the minimum allotted space. The nested arrangement of the respective bands permits the entire device to be assembled without the need for retaining fasteners.

As pointed out hereinbefore, the cylinder 10 and its end caps 11 and 12 may be omitted if desired. In that case the configuration of the shield illustrated in FIGS. 5–7 may be used to advantage. These figures illustrate bands 20, 21 and 22 which may be made in the manner previously explained. Again each of the bands is a continuous loop which may be formed from a strip of magnetic material welded together at its ends. Each of the bands has a substantially rectangular outline. It will be seen from FIGS. 5–7 that the three bands have open faces which extend along planes disposed in nested relationship as shown in the three figures so that the open faces of each band as 20 are covered by the material of the next band such as 21.

A magnetic shield of the type illustrated in FIGS. 5–7 is particularly suitable where it is desired to exclude both transverse as well as axial components of an undesired magnetic field. In other words, this shield will protect an enclosed device from extraneous magnetic fields extending in any direction. If space limitations permit, the individual elements 20–22 may be so dimensioned that the resulting shield is approximately a cube to improve the omnidirectional shielding effect.

Instead of making each of these bands such as the bands 14–17 or 20–22 of a single strip of material it is also feasible to make each of the bands of two separate pieces of material. This has been illustrated in FIG. 8 to which reference is now made. The band of FIG. 8 consists of two parts 25 and 26. Thus the member 25 is essentially of U-shape configuration, as is the member 26. The two members are pushed into each other to provide a considerable overlap. As explained hereinabove, this minimizes the reluctance of the air gap between the two members and obviates the need for welding across the air gap. By means of this arrangement of the invention, a considerable overlap of mating shield elements is achieved without the need for fabricating extruded end elements. Hence, although the band is not continuous, it is still possible to obtain good magnetic shielding with a minimum of expense and effort.

It will be understood that the band of FIG. 8 may be used with the embodiments of the invention of FIGS. 1-4 or FIGS. 5-7. The advantage of the configuration of FIG. 8 is that it eliminates the need for welding the strip together and thus reduces the expense and complexity of the fabrication process.

There has thus been described a magnetic shield for protecting an enclosed electronic device from the influence of extraneous magnetic fields and, in particular, from the components thereof extending along the direction of the axis of the device. Alternatively, the shield may be designed to protect the device from a magnetic field extending in any direction. The magnetic shield may be readily manufactured without the need for expensive dies. The shield may be easily disassembled to obtain access to the enclosed device. Furthermore, the shield of the invention takes up little space and is light in weight. Finally, effectiveness of this shield configuration is such that in many applications it is not necessary to manufacture the shield of costly Mu-metal; instead in such cases it may be made of less expensive transformer iron or other magnetic material which may be more readily fabricated.

Although there have been described above specific arrangements of a magnetic shield in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A magnetic shield for shielding an enclosed device comprising an open-ended cylinder enclosing said device and consisting of magnetic material, two cylindrical caps of magnetic material closing the open ends of said cylinder, and first, second, third and fourth elements of magnetic material, each element comprising a sheet of rectangular outline and closed upon itself to provide a continuous loop of substantially rectangular cross section, said four elements nesting in succession inside each other in such a manner that said second element is disposed to cover the open sides of said first element, said third element covering the open sides of said second element, and said fourth element covering the open sides of said third element, with the open sides of the respective elements being disposed in planes substantially parallel to the longitudinal axes of the cylinder and of the device.

2. A magnetic shield in accordance with claim 1 further comprising means for admitting an electrical cable through the shield for connection to the enclosed device.

3. A magnetic shield arrangement particularly adapted for shielding the gas cell of an atomic frequency standard from the earth's magnetic field comprising an inner shield element of a magnetic shielding material in the form of an open-ended cylinder enclosing the gas cell and a pair of end caps closing the ends of the cylinder, and a plurality of bands of magnetic shielding material nested together to enclose the inner shield element, each of said bands being in the form of an open-ended box and having a first dimension related to a second dimension of an adjacent band such that the bands nest tightly together with the open sides of one band closed by an adjacent band.

References Cited by the Examiner

UNITED STATES PATENTS

| 2,388,848 | 11/1945 | Howe | 174—35 |
| 2,463,778 | 3/1949 | Kellogg | 174—35 |
| 2,488,710 | 11/1949 | Cooper | 174—35 |
| 2,864,963 | 12/1958 | Dornstreich et al. | 174—35 X |

OTHER REFERENCES

Perfection: "Subminiature Co-Netic Magnetic Shielding Capsules," Data sheet #137, published by Magnetic Shield Division of Perfection Mica Company, April 8, 1959.

JOHN F. BURNS, *Primary Examiner.*

JOHN P. WILDMAN, LARAMIE E. ASKIN,
*Examiners.*